R. P. GREENLEAF.
LOADING APPARATUS.
APPLICATION FILED DEC. 29, 1911.
1,204,760.
Patented Nov. 14, 1916.
4 SHEETS—SHEET 1.
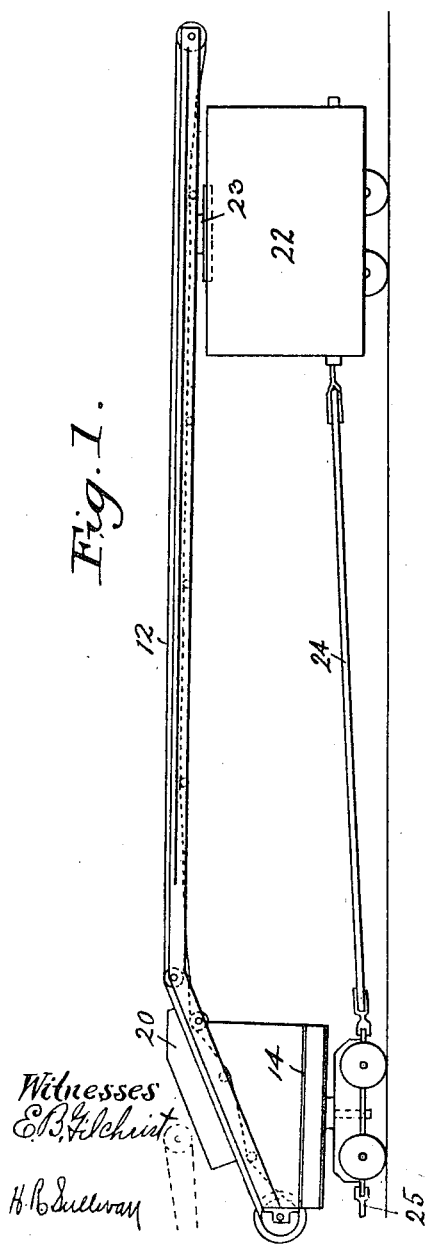
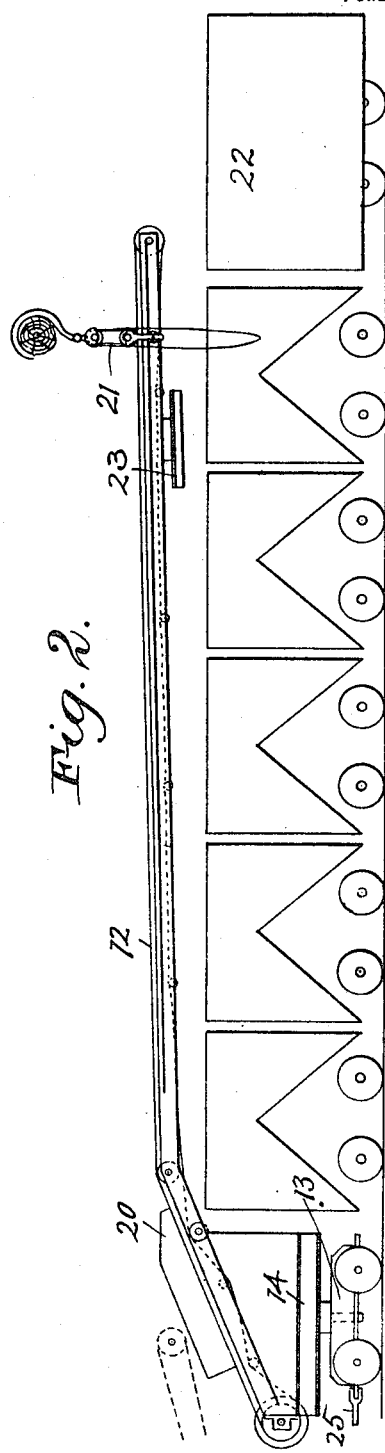

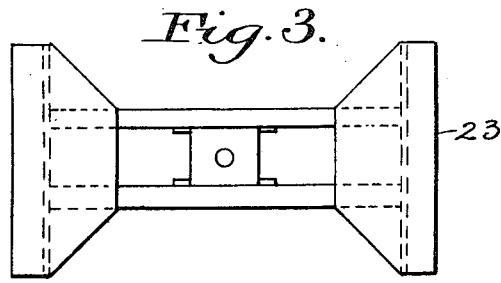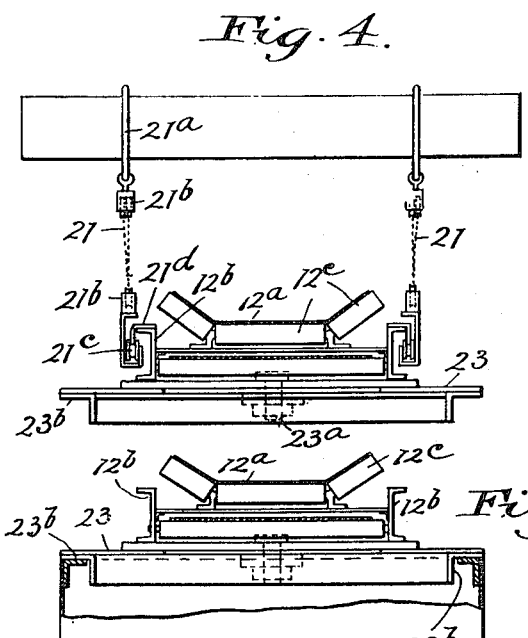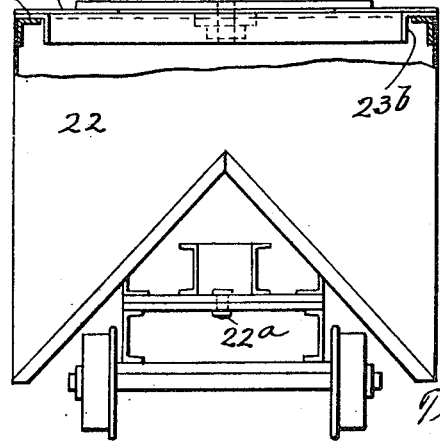

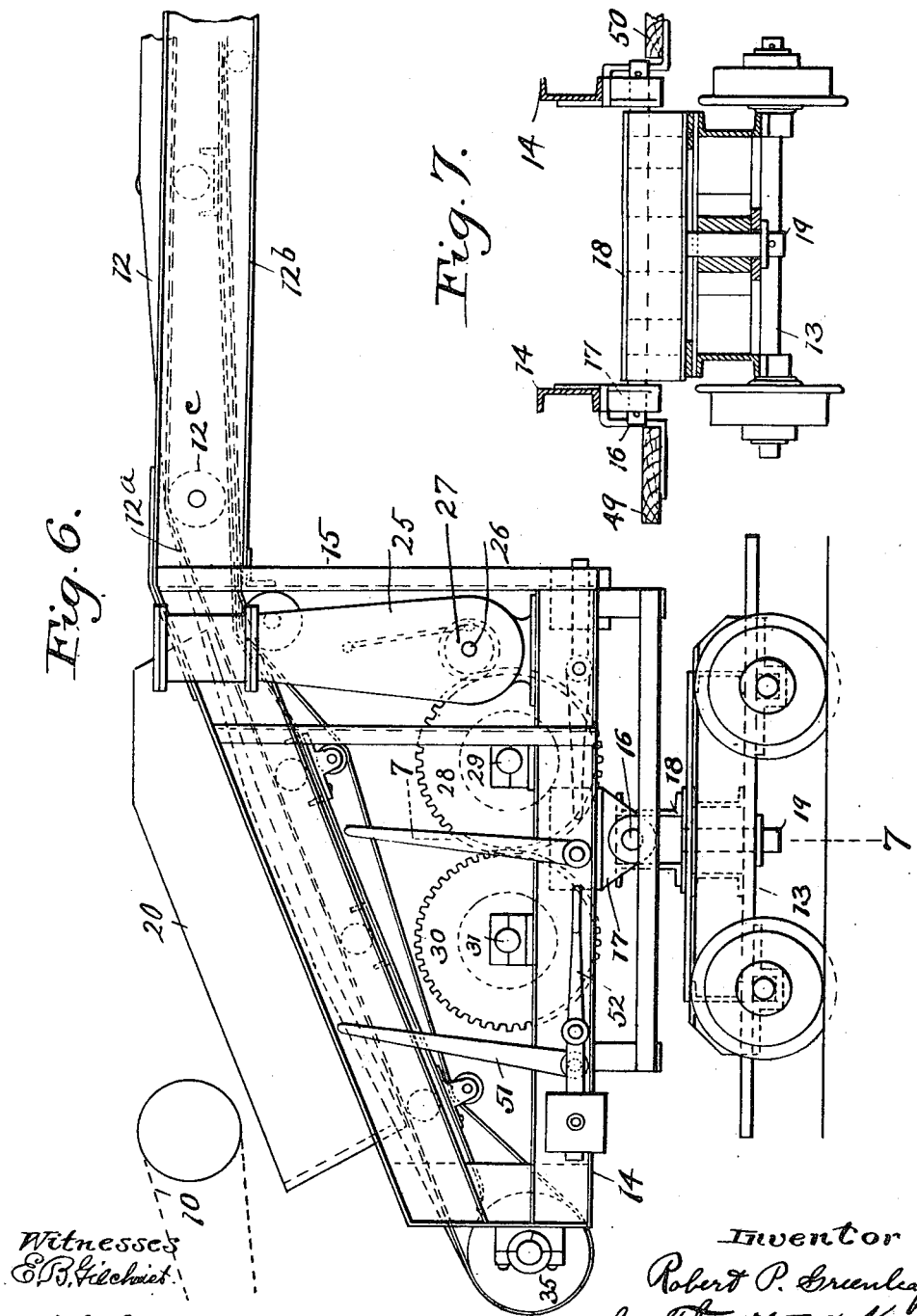

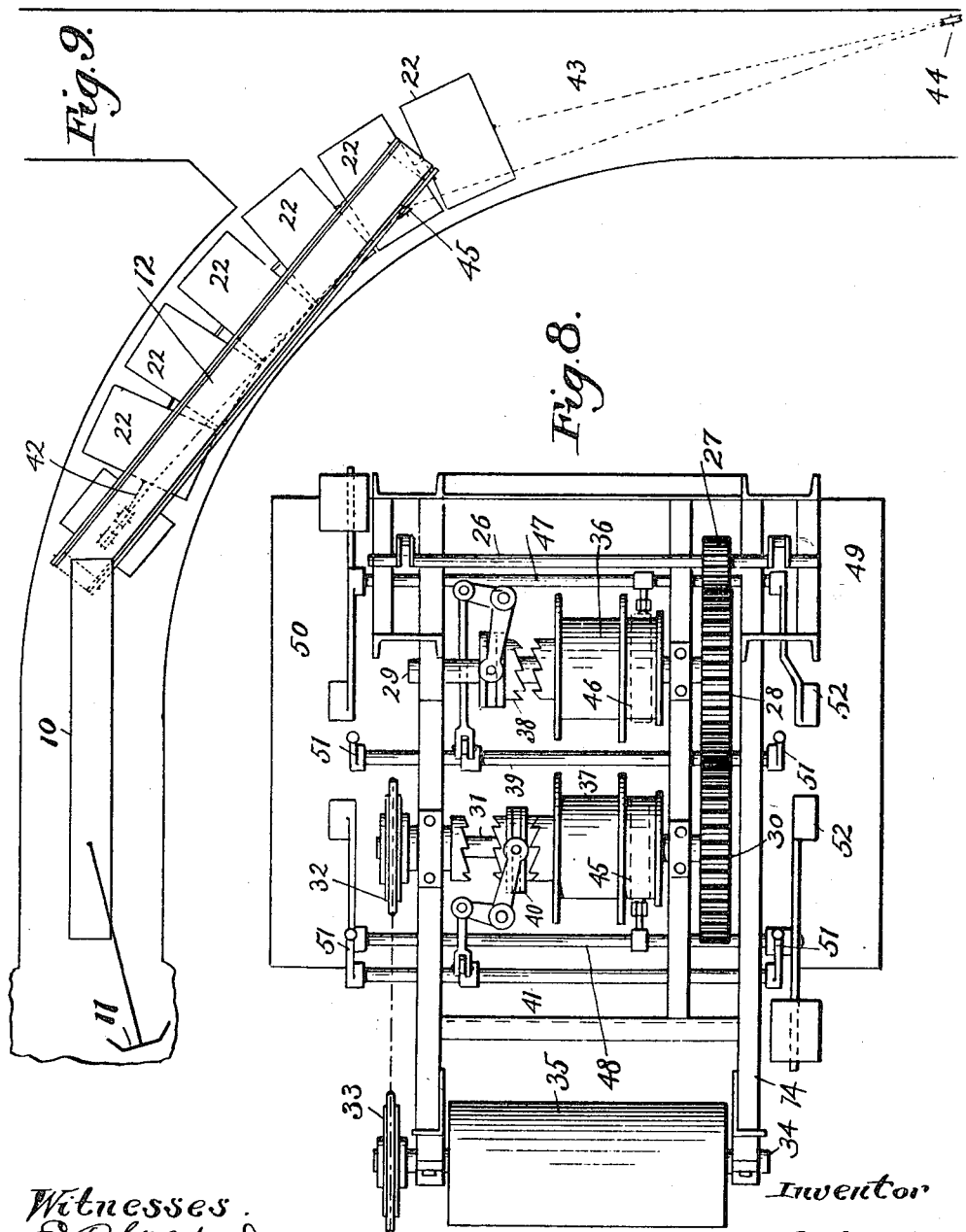
R. P. GREENLEAF.
LOADING APPARATUS.
APPLICATION FILED DEC. 29, 1911.
1,204,760.
Patented Nov. 14, 1916.
4 SHEETS—SHEET 4.

UNITED STATES PATENT OFFICE.

ROBERT P. GREENLEAF, OF CLEVELAND, OHIO, ASSIGNOR TO FRANK BILLINGS, OF CLEVELAND, OHIO.

LOADING APPARATUS.

1,204,760.  Specification of Letters Patent.  Patented Nov. 14, 1916.

Application filed December 29, 1911. Serial No. 668,391.

*To all whom it may concern:*

Be it known that I, ROBERT P. GREENLEAF, a citizen of the United States, residing at Cleveland, in the county of Cuyahoga and State of Ohio, have invented a certain new and useful Improvement in Loading Apparatus, of which the following is a full, clear, and exact description.

This invention relates to loading apparatus for use in mines, and is an improvement over the loading apparatus disclosed in the prior application of Frank Billings, Serial No. 538,408, filed January 17, 1910, for mining and loading apparatus, and in the patent to Frank Billings for conveyer for use in mines, No. 1,030,226, granted June 18, 1912. In said application of Billings, there is disclosed a loading apparatus which is designed especially to reduce the cost of loading into cars the material which has been loosened from the face of a mine drift, and to diminish the loss of time incident to the switching of loaded and unloaded cars. This apparatus includes mechanism for digging and collecting the loose material, and two conveyers,—a main conveyer which receives the material from the digging and collecting mechanism and conveys the same rearwardly, and an auxiliary conveyer such as shown in the Billings patent above referred to arranged at the rear of the main conveyer and adapted to receive the material discharged from said main conveyer. This auxiliary conveyer is made as long as possible and as shown in said application is normally supported from the overhead timbering of the drift so that a number of cars can be run beneath this conveyer at one time, thereby doing away with the necessity of shifting back and forth a single car. It was proposed to support this auxiliary conveyer from the overhead timbering of the mine so that the empty cars may be run beneath the conveyer and also in order that the main conveyer and digging mechanism may be readily shifted past the same to another part of the mine or may be backed up beneath the auxiliary conveyer from time to time as material at the face of the drift is being blasted loose. It was found, however, that in view of the frequent sagging of the overhead timbering, it is often impossible to support the auxiliary conveyer from this timbering so as to leave sufficient overhead clearance to back the main conveyer and loader proper beneath the auxiliary conveyer. It was found also that there was a considerable loss in time in first backing away the auxiliary conveyer and raising its forward end so that the latter would be clear of the rear end of the main conveyer.

The present invention has for its objects to provide a loading apparatus in some respects similar to that disclosed in the Billings application, but which is more efficient than the latter, and wherein the various parts are so arranged and supported that the entire apparatus or the parts thereof may be readily shifted about without unnecessary delays.

The present invention in one of its aspects relates to the construction and manner of supporting the auxiliary conveyer which in the preferred embodiment of my invention, is supported at its forward end by a truck adapted to be run along the track of the mine and at its rear end is normally supported independently of the truck and of the mine track so that the cars may be run beneath the same, while at the same time, when it becomes necessary to shift the conveyer, a suitable connection can be made at the rear end of the conveyer with a truck or with one of the ore cars.

The above and other features to be referred to in the detail description, constitute my invention, which may be briefly summarized as consisting in certain novel details of construction and combinations and arrangements of parts which will be described in the specification and set forth in the appended claims.

In the drawings, Figure 1 is a side view of a portion of the loading apparatus arranged in accordance with my invention, the rear portion of the auxiliary conveyer being here shown as supported for movement along the mine track. Fig. 2 is a similar view showing the conveyer in position for use for loading the ore cars, this view also illustrating the feature of the ore cars which enables a large number of cars to be accommodated beneath the conveyer. Fig. 3 is a plan view of a bolster which I prefer to employ for making temporary supporting pivotal connection between the rear end of the auxiliary conveyer and one of the ore cars when it is necessary to shift the conveyer. Fig. 4 is an end view of the conveyer looking toward its rear end with said end supported from the overhead timbering. Fig. 5 is a similar view of the same end of the conveyer supported on one of the ore cars for movement along the drift. Fig. 6 is an enlarged side sectional elevation of a forward portion of the auxiliary conveyer. Fig. 7 is a partial transverse sectional view substantially along the line 7—7 of Fig. 6. Fig. 8 is a plan view of the main parts of the mechanism provided at the forward end of the auxiliary conveyer for operating the belt and for shifting the cars; and Fig. 9 is a plan view of a portion of a mine tunnel and drift showing conventionally the main parts of the loading machine.

The loading and conveying apparatus in which the features constituting the present invention are of particular utility, preferably includes a main conveyer 10, some form of apparatus for digging the loose material and moving the same onto the conveyer 10, such as a suitably operated digging and scraping hoe 11, shown conventionally in Fig. 9, and an auxiliary conveyer 12, which is arranged at the rear of the main conveyer 10, with its forward end beneath the rear end of the latter so as to receive the material therefrom and convey the same rearwardly. The present invention concerns particularly the conveyer 12 and hence I do not consider it necessary to illustrate further the other portions of the loading and conveying apparatus. In fact, the portion of the apparatus which digs, collects, and deposits the material onto the auxiliary conveyer may be of any suitable construction.

I prefer that the conveyer 12 be of the endless belt type, and that it include an endless belt 12$^a$ and a supporting frame therefor rigid from one end thereof to the other, and having side stringers 12$^b$, which may consist of channels suitably connected together and supporting rollers 12$^c$ which may be arranged at proper intervals so as to prevent the belt sagging to an undesirable extent under the load. Preferably part of the rollers are so arranged that the sides of the upper leg of the belt are inclined so that in cross section the belt will be somewhat U-shaped as indicated in Figs. 4 and 5. This is provided for the obvious purpose of preventing loss of the conveyed material between the forward and the rear ends of the conveyer.

Instead of supporting the conveyer 12 entirely from the overhead timbering of the mine, as has been proposed heretofore, and instead of providing the conveyer with two or more jointed sections by which the forward end may be raised and lowered, I support the forward end of the conveyer which is arranged at an inclination, as best shown at Figs. 1, 2 and 6, upon a truck 13 which is adapted to travel along the track of the mine. Above the truck is a substantially horizontal frame 14 which is connected to the inclined forward portion of the conveyer frame by suitable upright members 15. The entire conveyer is connected to the truck so that it may swivel about a horizontal axis and also may turn about a vertical axis in order that the truck may take the turns of the mine drifts or tunnels and may readily accommodate itself to undulations of the mine track, or may have its rear end raised or lowered relative to the forward end, for a purpose to be described. Preferably, the conveyer is swiveled for movement in a vertical plane by means of a substantially horizontal shaft 16, which passes through suitable brackets or hangers 17 rigid with the frame 14 and through a bolster 18, and the truck is swiveled for movement in a horizontal direction through the medium of a king bolt 19 which connects the bolster directly to the truck frame. This construction is best illustrated in Figs. 6 and 7. The frame 14 supports suitable motive devices for operating the endless belt 12$^a$ and also for shifting conveying cars which receive the material from the conveyer 12, as will be explained presently.

Supported on the inclined forward portion of the auxiliary conveyer, preferably on the side stringers 12$^b$, is a hopper 20 which is directly beneath the rear end of the main conveyer 10 and guides the material onto the belt of the auxiliary conveyer, which belt passes beneath the hopper.

Although the forward end of the conveyer 12 is permanently supported from the track through the medium of the truck 13, I preferably support the rear end of the conveyer independently of the truck 13 and independently of the track, and at a suitable height above the latter so that a number of empty cars may be run at one time beneath this conveyer. For supporting the rear end of the conveyer when the latter is in position for conveying the material from the conveyer 10 to the empty cars, I may utilize a number of hangers 21, illustrated in Figs. 2 and 4. These hangers include hooks 21$^a$ adapted to engage the overhead mine timbering and upper and lower tackle blocks 21$^b$. Preferably the lower tackle blocks are provided with rollers 21$^c$ which engage rails 21$^d$ secured to the side stringers of the conveyer, which rails may consist of downwardly extending flanges of angles secured to the upper horizontal flanges of the channels forming the side stringers 12$^b$. Thus, when the conveyer is in position for use, its forward end is permanently supported from the track by the truck and its rear end is supported independently of the truck and independently of the track by supporting means in the nature of a trolley construction. Supporting means of this character render it possible for the conveyer to be shifted short distances along the track without necessitating interference with or adjustment of the hangers. While this rear end supporting means cannot be made use of when the conveyer is to be shifted any considerable distance, nevertheless, it is very effective when the conveyer is to be shifted only short distances. Furthermore, by means of these hangers the rear end of the conveyer can be raised and lowered when necessary, the entire conveyer then turning about the horizontal pivotal shaft 16 as an axis.

When it becomes necessary to shift the auxiliary conveyer or the entire loading apparatus any considerable distance, say from one portion of the mine to another, I preferably employ as the support for the rear end of the conveyer, a truck consisting preferably of one of the ore or material conveying cars 22, as illustrated in Fig. 1. In order that I may employ one of these cars as a truck for the rear end of the conveyer, I provide a special bolster 23, which preferably, although not necessarily, is permanently connected to the lower side of the conveyer 12 near its rear end. This bolster, whether it is permanently or only temporarily carried by the conveyer, is connected thereto by a king bolt 23ª (see particularly Fig. 4) so that there may be a relative turning movement between the car and the conveyer in taking the turns. Preferably the bolster is formed of suitable plates and structural members, and is so constructed that it, or a portion thereof will fit down between the parallel sides of the car as well illustrated in Fig. 5. I may employ along the sides of the bolster angles 23ᵇ, whose vertical flanges will extend down into the car along its sides and whose horizontal flanges will project over and rest upon the sides of the car. When the conveyer is thus supported at its forward end by means of the truck and at its rear end by one of the ore cars 22, for movement along the track, I prefer to connect the car to the truck 13 by means of a coupling bar 24 shown in Fig. 1. If the rear conveyer is connected to the main conveyer and loader proper by a coupling 25, a portion of which is shown in both Figs. 1 and 2, the entire loading apparatus may be transferred as a unit with the aid of a mine locomotive.

With the construction above described, the conveyer may be readily positioned and supported for use with an unobstructed space beneath the conveyer for a number of empty cars 22, and at the same time the conveyer can be easily shifted, such as when it is necessary to transfer the loader from one part of the mine to another, or to advance the loader as progress is made along the drift, or to back the loader from the face of the drift when circumstances demand it. Further, this auxiliary conveyer can be shifted much more quickly than is possible with a conveyer constructed and supported as has been proposed heretofore, while at the same time it may be given the proper length for the accommodation of a number of cars beneath it and operates in a satisfactory manner as far as loading is concerned.

I prefer to employ conveying cars 22, each having a body which is swiveled, by means of a king bolt, or pin 22ª, to a truck bolster, so that the bodies may be turned transversely of the track, as shown in Fig. 2, to permit a large number of cars to be placed at one time beneath the auxiliary conveyer.

Usually cars will be brought to the conveyer by means of a mine locomotive and then the cars are uncoupled and the car bodies are turned at right angles to normal positions, as illustrated in Fig. 2, and then the cars may be recoupled, for a purpose to be next explained.

As will be understood by reference to Fig. 2, preferably the last car of the group which is underneath the conveyer is first filled, and when this car is filled, the next car is filled by moving the cars rearwardly until the next to the last car of the group is in position to receive the material. These cars may occasionally be shifted by hand, but at other times this is impossible or very difficult, by reason of the track inclination and other conditions. In such cases, it is necessary to utilize the mine locomotive for shifting the cars so that the latter will be brought successively beneath the discharge end of the conveyer.

I shall next describe a novel feature of my invention by which the motive power provided on the auxiliary conveyer may be utilized for shifting the cars forwardly or rearwardly so that they may be successively filled, thus doing away with the necessity for hand shifting and the use of a mine locomotive for this purpose.

On the frame 14 at the forward end of the conveyer, I provide one or more motors 25, which in this case are upright air or steam engines, operating on a crank shaft 26, shown in Fig. 8. The motors carried by the conveyer are employed primarily for driving the belt 12ª and the driving connections between the motors and the belt include in this case a gear 27 on the crank shaft 26, a larger gear 28 on a shaft 29, a similar gear 30 on a shaft 31, and a sprocket wheel and chain construction including a sprocket 32 on the shaft 31, and a sprocket 33 on a shaft 34, the latter having secured to it a driving drum 35 about which the belt 12ª passes. In order that the cars may be shifted rearwardly and forwardly by the motor or engine 25, the shafts 29 and 30, which it will be observed are always driven in opposite directions, are provided respectively with normally loose drums 36 and 37. The drum 36 is adapted to be clutched to the shaft 29 by a clutch 38 connected to a clutch shaft 39, and the drum 37 is adapted to be clutched to the shaft 31 by a clutch member 40 connected to a clutch shaft 41. This clutch member 40, when in one operative position, forms a driving engagement between the shaft 31 and the drum 37, and when in a second operative position forms a driving engagement between the shaft 31 and sprocket 32. Consequently, when the drum 37 is driven, the belt is not driven, and vice versa. One of these drums is adapted to receive a cable 42 (see Fig. 9) which may be connected to the forward car 22, and the other drum is adapted to receive a cable 43 which extends rearwardly beyond the cars about a sheave 44 which may be connected to any suitable part of the mine timbering and thence forwardly to the rear car. If the cars are arranged on a curve of the drift as illustrated in Fig. 9, an intermediate idler pulley 45 may be employed to guide the cable 43, which pulley may be connected to the conveyer or to one of the hangers. To move the group of cars forwardly, the drum 36 may be clutched to the shaft, and the cable 43 allowed to pay out off the drum 37, which is designed at such time to turn loosely on the shaft. To move the cars rearwardly, such as when one car has already been filled, and it is desired to fill the next adjacent car, the drum 37 may be driven so as to wind in the cable 43, and the cable from the drum 36 may then be allowed to pay out. The paying out of the cable from either of the drums is controlled by band brakes 45 and 46 which engage brake drums and are controlled by brake shafts 47 and 48. The frame 14 of the conveyer has on both sides platforms 49 and 50, upon which the operator may stand to control the motive device and the car shifting mechanism. Preferably, the clutch shafts 39 and 41 and the brake shafts 47 and 48 extend across the frame and at both ends are provided with clutch or brake levers, so that the mechanism can be operated quickly from either of the platforms. The clutch shafts are preferably provided with hand levers 51, and the brake shafts with foot levers 52.

Although I prefer to fill the group of empty cars by filling first the last or rear car of the group and then by moving the group rearwardly so that the next to the last car may be filled, this operation may be reversed by filling first the forward car of the group and then by moving the group forwardly so as to cause the car behind to be filled, and so on until all the cars are filled. Further, while I prefer to employ one of the cars as the rear truck for the conveyer when the latter is to be transported, I may employ for this purpose a low special truck which, when not in use, may be removed from the track and placed alongside the latter and the conveyer until its service is required.

When the conveyer is in use, its rear end is preferably supported from overhead mine timbering as before stated, but when the loading apparatus is used in certain kinds of mines, such as coal mines, or when it is otherwise not possible or desirable to support the rear end of the conveyer from overhead mine timbering, I may support such rear end independently of the track and at a proper distance above the same by any suitable supporting means which may be a portable or knock-down supporting structure provided for this special purpose.

With the above described novel features, I am enabled to obtain a degree of efficiency in a mine loading and conveying apparatus, not heretofore obtainable as far as I am aware, the main advantages of my improvements being the saving of time in shifting the conveyer or loader, faster loading and conveying of the loosened material whether it be ore, coal or the like, and a great saving in time required in switching empty and loaded cars, the present improvements rendering it unnecessary to stop the loading operation and to shift the cars as frequently as heretofore. This is of very great importance in certain kinds of mines where the small dimensions of the working space render impossible the use of double tracking.

I claim—

1. In a loading and conveying apparatus for use in mines, a conveyer having means for conveying material rearwardly along the same, a truck supporting the forward end of the conveyer and adapted to run along a mine track, said conveyer and truck having pivotal connections which permit the conveyer to turn about a horizontal axis and about a vertical axis, devices for supporting the rear end of the conveyer at a suitable height above the mine track so that a plurality of cars may be run along the track beneath the conveyer, said devices permitting the conveyer as a whole to be moved along the track while the conveyer is supported by the truck and by said devices.

2. In a loading and conveying apparatus for use in mines, a conveyer including a rigid frame and means for conveying material rearwardly along the said frame, a truck supporting the forward end of the conveyer and adapted to run along a mine track, said frame having pivotal connections with the truck by which the conveyer may be turned about a horizontal axis and about a vertical axis, and means for supporting the rear end of the conveyer independently of the truck and independently of and above the track so that a plurality of cars may be run along the mine track beneath the conveyer.

3. In a loading and conveying apparatus, a conveyer having means for moving material rearwardly along the same, a truck supporting the forward end of the conveyer and adapted to run along a track, said conveyer and truck having pivotal connections which permit the conveyer to turn about a horizontal axis and about a vertical axis, and means for supporting the rear end of the conveyer independently of the track and from above the same, said means comprising rails carried by the conveyer and supporting devices having rollers which are engaged by said rails.

4. In a loading and conveying apparatus for use in mines, a conveyer having means for conveying material rearwardly along the same, a truck supporting the forward end of the conveyer and adapted to be run along a mine track, and means for supporting the rear end of the conveyer from the overhead mine timbering comprising hangers connected to the overhead timbering and to the conveyer, the connection between the hangers and the conveyer comprising rails and rollers by which the conveyer may have a limited movement relative to the hangers.

5. In a loading and conveying apparatus for use in mines, a conveyer having means for conveying material rearwardly along the same, a truck supporting the forward end of the conveyer and adapted to run along the mine track, and means for supporting the rear end of the conveyer from overhead mine timbering comprising rails along the sides of the conveyer and hangers adapted to be connected to the overhead timbering and having rollers which are engaged by said rails.

6. In a loading and conveying apparatus for use in mines, a conveyer provided with means for conveying material rearwardly along the same, a truck supporting the forward end of the conveyer and adapted to run along the track of a mine, means for normally supporting the rear end of the conveyer independently of the truck and of the mine track so that a number of cars may be placed beneath the conveyer, and a connecting device for providing a temporary supporting connection between the rear end of the conveyer and a truck when the conveyer is to be shifted.

7. In a loading and conveying apparatus for use in mines, a conveyer having means for conveying the material rearwardly along the same, a truck supporting the forward end of the conveyer and adapted to run along the track of a mine, means for normally supporting the rear end of the conveyer independently of said truck and independently of the mine track, and at a suitable height above the mine track such that a number of cars may be run along the track beneath the conveyer, and means for forming a temporary pivotal supporting connection between the rear end of the conveyer and one of the cars comprising a bolster adapted to engage the side portions of the car and to have pivotal connection with the conveyer.

8. In a loading and conveying apparatus for use in mines, a conveyer comprising a conveyer frame and means supported thereby for conveying material rearwardly along the same, a truck supporting the forward end of the conveyer and having a pivotal connection with the conveyer frame, means normally supporting the rear end of the conveyer independently of the truck and of the mine track and at a distance above the track so that a number of cars may be run along the track beneath the conveyer to a point adjacent the truck, and means for temporarily supporting the rear end of the conveyer from a truck on the track so that the conveyer may be shifted along the track, said means comprising a bolster supported on the lower side of the conveyer and having a pivotal connection therewith and adapted to rest upon the truck.

In testimony whereof, I hereunto affix my signature in the presence of two witnesses.

ROBERT P. GREENLEAF.

Witnesses:
H. R. SULLIVAN,
A. F. KWIS.